United States Patent
Babin et al.

(10) Patent No.: US 12,203,025 B2
(45) Date of Patent: Jan. 21, 2025

(54) MODIFIED DIENE-CONTAINING (CO)POLYMER, METHOD FOR PREPARING THEREOF AND USE AS A FLAME RETARDANT

(71) Applicant: PUBLIC JOINT STOCK COMPANY "SIBUR HOLDING", Tobolsk (RU)

(72) Inventors: Ivan Anatolievich Babin, Tomsk (RU); Svetlana Igorevna Gustyakova, Istanitsa Dinskaya (RU); Egor Evgenievich Popovtsev, g. Seversk (RU); Denis Alekseevich Lenev, Khimki (RU)

(73) Assignee: Public Joint Stock Company "Sibur Holding", Tobolsk (RU)

( * ) Notice: Subject to any disclaimer, the term of this patent is extended or adjusted under 35 U.S.C. 154(b) by 786 days.

(21) Appl. No.: 17/418,599

(22) PCT Filed: Dec. 27, 2018

(86) PCT No.: PCT/RU2018/000887
§ 371 (c)(1),
(2) Date: Jun. 25, 2021

(87) PCT Pub. No.: WO2020/139112
PCT Pub. Date: Jul. 2, 2020

(65) Prior Publication Data
US 2022/0073823 A1    Mar. 10, 2022

(51) Int. Cl.
C09K 21/14    (2006.01)
C08F 212/08    (2006.01)
(Continued)

(52) U.S. Cl.
CPC ............ *C09K 21/14* (2013.01); *C08F 212/08* (2013.01); *C08F 236/10* (2013.01); *C08J 9/0061* (2013.01);
(Continued)

(58) Field of Classification Search
CPC ...... C09K 21/14; C08F 212/08; C08F 236/10; C08F 2810/00; C08J 9/0061; C08J 9/141;
(Continued)

(56) References Cited

U.S. PATENT DOCUMENTS 5,086,078 A    2/1992    Harclerode et al.
8,663,649 B2 *    3/2014    Garg ................... A61K 39/005
                                                                536/23.7
(Continued)

FOREIGN PATENT DOCUMENTS

EP    3301135 A1    4/2018
RU    2414479 C2    3/2011
(Continued)

OTHER PUBLICATIONS

Nae et al. "Epoxidation of Bromostyrene—Butadiene Cotelomers", Journal of Polymer Science Part A: Polymer Chemistry, vol. 24, Issue 6, 1986, pp. 1239-1249, (Year: 1986).*
(Continued)

*Primary Examiner* — Michael M. Bernshteyn
(74) *Attorney, Agent, or Firm* — Banner & Witcoff, Ltd.

(57) ABSTRACT

Disclosed herein are modified diene-containing (co)polymers, in particular, modified styrene-butadiene copolymer, which can be used as flame retardants for expandable polystyrene polymer compositions. In particular, disclosed is a modified diene-containing (co)polymer, a method for preparing it, and use as a flame retardant for expandable polystyrene. The modified diene-containing (co)polymer claimed in the invention is characterized by high thermo-
(Continued)

stability, namely, a 5% weight loss temperature of at least 180° C., a molecular weight of at least 1500 g/mol and a halogen content of at least 35 wt. %; the content of tertiary and/or allyl halogenides is in the range from 0 to less than 1.5 wt. %, and also does not affect the polymerization process and the formation of polystyrene granules either, and allows to obtain polystyrene granules with a yellowness index of 2 to 6 units, comparable to the yellowness index of polystyrene granules containing HBCD (from 0 to 3 units).

62 Claims, 4 Drawing Sheets

(51) Int. Cl.
*C08F 236/10* (2006.01)
*C08J 9/00* (2006.01)
*C08J 9/14* (2006.01)
*C08J 9/20* (2006.01)
*C08L 25/06* (2006.01)

(52) U.S. Cl.
CPC .............. *C08J 9/141* (2013.01); *C08J 9/20* (2013.01); *C08L 25/06* (2013.01); *C08F 2810/00* (2013.01); *C08J 2203/14* (2013.01); *C08J 2203/22* (2013.01); *C08J 2325/06* (2013.01); *C08J 2425/10* (2013.01); *C08J 2439/06* (2013.01); *C08J 2447/00* (2013.01); *C08L 2201/02* (2013.01); *C08L 2203/14* (2013.01); *C08L 2205/025* (2013.01); *C08L 2205/03* (2013.01)

(58) Field of Classification Search
CPC . C08J 9/20; C08J 25/06; C08J 2203/14; C08J 2203/22; C08J 2325/06; C08J 2425/10; C08J 2439/06; C08J 2447/00; C08L 2201/02; C08L 2203/14; C08L 2205/025; C08L 2205/03
USPC .......................................................... 521/59
See application file for complete search history.

(56) References Cited

U.S. PATENT DOCUMENTS

| | | | | |
|---|---|---|---|---|
| 9,663,649 | B2 * | 5/2017 | Kram | C08L 25/06 |
| 10,920,039 | B2 * | 2/2021 | Konno | C08L 9/06 |
| 2008/0287559 | A1 * | 11/2008 | King | C08J 9/16 |
| | | | | 525/359.2 |
| 2010/0331497 | A1 * | 12/2010 | Vogel | C08F 8/08 |
| | | | | 525/418 |
| 2016/0137826 | A1 * | 5/2016 | Kram | C08L 53/025 |
| | | | | 523/435 |
| 2018/0094117 | A1 * | 4/2018 | Konno | C08K 3/26 |

FOREIGN PATENT DOCUMENTS

| | | |
|---|---|---|
| RU | 2530021 C2 | 10/2014 |
| WO | 2008/021417 A2 | 2/2008 |
| WO | 2008021418 A1 | 2/2008 |
| WO | 2010080285 A2 | 7/2010 |
| WO | 2016/123263 A1 | 8/2016 |

OTHER PUBLICATIONS

Oct. 16, 2019—(WO) International Search Report and Written Opinion of the International Searching Authority—App PCT/RU2018/000887.

International Search Report and Written Opinion mailed Oct. 16, 2019, directed to International Application No. PCT/RU2018/000887; 9 pages.

United Nations Environmental Program (UNEP). "Persistent Organic Pollutants Review Committee Sixth Meeting—Draft risk profile: hexabromocyclododecane," Stockholm Convention on Persistent Organic Pollutants, Oct. 11-15, 2010, Geneva, Switzerland; 42 pages.

"Hexabromocyclododecane", Draft Risk Profile, Stockholm Convention on Persistent Organic Pollutants, United Nations Environment Program, Persistent Organic Pollutants Review Committee Meeting. Sixth Meeting, Jul. 21, 2010, 42 pages.

"Technical Rules on Flame Safety Requirements", Article 13, Clause 7, Federal Law No. 123-FZ, Jul. 22, 2008, as amended on Jul. 29, 2017, 176 pages (w/partial translation).

* cited by examiner

MODIFIED DIENE-CONTAINING (CO)POLYMER, METHOD FOR PREPARING THEREOF AND USE AS A FLAME RETARDANT

CROSS REFERENCE TO RELATED APPLICATIONS

This application is a U.S. national stage application under 35 U.S.C. § 371 of International Application No. PCT/RU2018/000887, filed on Dec. 27, 2018, the entire contents of which is incorporated herein by reference.

FIELD OF THE INVENTION

The present invention relates to the field of modified diene-containing (co)polymers, particularly to a modified styrene-butadiene copolymer that may be used as a flame retardant for polymer compositions comprising expandable polystyrene. Particularly, the invention relates to a modified diene-containing (co)polymer, a method for preparing thereof, and use as a flame retardant for polystyrene, including expandable polystyrene.

BACKGROUND OF THE INVENTION

Flame retardants are widely used in articles made of different polymers and polymer compositions, e.g., in articles comprising an expandable polystyrene to provide them flame retardant properties [Stockholm Convention on Persistent Organic Pollutants, UNEP/POPS/POPRC.6/10, Oct. 15, 2010]. Various low-molecular brominated compounds, e.g., hexabromocyclododecane (HBCD), are usually used in these polymer compositions as flame retardants. However, results of many studies have shown the ability of HBCD to the bioaccumulation, high toxicity and stability to the environmental factors [Stockholm Convention on Persistent Organic Pollutants, UNEP/POPS/POPRC.6/10, Oct. 15, 2010, Article 4]. This has resulted in the restriction of the use of HBCD as the flame retardant with the aim of reducing ecological risks.

For some polymer compositions, e.g., comprising expandable polystyrene [Stockholm Convention on Persistent Organic Pollutants, UNEP/POPS/POPRC.6/10, Oct. 15, 2010, Article 74], processing temperatures often are very high, as a result of which the flame retardant may decompose during the processing treatment of the polymer composition. In this case, there is a loss of flame retardant properties by polymer compositions and the formation of decomposition products, such as HBr. Consequently, it is important that the flame retardant could be thermally stable at processing temperatures of polymer materials, and also could meet requirements of non-toxicity and environmental friendliness.

Prior art represented by documents WO2008021418 (D1), WO2008021417 (D2), WO2016123263 (D3), RU2414479 (D4), RU2530021 (D5), disclose alternative flame retardants which are more eco-friendly as compared to HBCD and are obtained on the basis of diene-containing (co)polymers, in particular, styrene-butadiene copolymers.

Thus, in particular, application WO2008021418 (D1) proposes a process of preparing a brominated styrene-butadiene copolymer having a 5% weight loss temperature of at least 200° C. The known process of preparing a brominated styrene-butadiene copolymer comprises (a) contacting a solution of a starting copolymer in a solvent with elemental bromine in an amount of from 0.5 to 1.5 equivalents per equivalent of aliphatic carbon-carbon double bonds in the starting copolymer, wherein said contact being in the presence of at least 0.5 mole of an aliphatic alcohol per mole of the bromine; and (b) maintaining the reaction solution under reaction conditions for a period of time sufficient to brominate more than 50 percent of aliphatic double bonds contained in the starting copolymer.

The process known from D1 is characterized by using as a brominating agent the elemental bromine, which results in the formation of tertiary bromides in the molecule of a flame retardant that in turn results in the decrease in thermal stability of the obtained (co)polymer flame retardants.

It is indicated in RU2414479 (D4) that upon the use of the elemental bromine as the brominating agent for preparing a brominated styrene-butadiene copolymer, the reduced thermal stability of the flame retardant is provided by the formation of tertiary bromides via free-radical mechanisms. When placed in solution, such brominated copolymer releases bromine, hydrogen bromide (HBr) or both indicated substances. In addition, free-radical bromination in addition to the bromination of unsaturated carbon-carbon double bonds may result in the bromination of benzyl groups in vinyl aromatic moieties, which also has the influence on the thermal stability of the obtained flame retardant.

The prior art represented by documents WO2008021417 (D2), WO2016123263 (D3), RU2414479 (D4), RU2530021 (D5), also discloses the preparation of thermostable brominated butadiene copolymers by conducting the selective bromination reaction to provide the absence in the molecule of the flame retardant of tertiary bromides, where preferably tribromides are used as a brominating agent, such as a tetra-alkylammonium tribromide or pyridinium tribromide, which minimize or exclude the formation of moieties containing the tertiary bromine such as tertiary bromides. In accordance with the indicated sources, the bromination preferably proceeds according to ionic, in particular, cationic mechanism, not via free-radical mechanism. The ionic bromination is preferable in comparison with the free-radical bromination, since the latter results in the formation of products containing tertiary bromine, which in turn represent the main factor that introduces the contribution into the very poor thermostability of the obtained flame retardant.

Particularly, patent RU2414479 (D4) describes a thermostable brominated styrene-butadiene copolymer that may be used as a flame retardation expanded and non-expanded polymer materials. The known brominated styrene-butadiene copolymer is characterized by a 5% weight loss temperature that is at least 200° C. being determined according to the thermogravimetric analysis (TGA) method.

Furthermore, patent RU2414479 (D4) proposes a polymer mixture comprising the indicated thermostable brominated styrene-butadiene copolymer, and a moulded article comprising the indicated polymer mixture is also proposed.

The flame retardant known from D4 possesses low thermal stability that becomes apparent under high temperatures of processing an expandable polystyrene, and also the limited compatibility of high-brominated styrene-butadiene copolymers with polystyrene, which can make it difficult to obtain a homogeneous structure of the expanded polystyrene at high thicknesses of articles made thereof.

Patent application WO2016123263 (D3) discloses examples of polymer flame retardants for expandable polystyrene comprising hydroxybrominated styrene-butadiene copolymers.

The flame retardant described in application WO2016123263 (D3) is obtained by the bromination of from 50 to 98% butadiene repeating units in the starting styrene-butadiene copolymer with a quaternary ammonium tribromide to obtain a partially brominated copolymer, followed by reacting the partially brominated copolymer with N-haloimide compound, e.g., an N-chlorosuccinimide or N-bromosuccinimide, in the presence of water and a water-miscible solvent to halohydrate a part of the butadiene repeating units to produce a hydroxybrominated styrene-butadiene copolymer. The resulted hydroxybrominated styrene-butadiene copolymer comprises from 2 to 50 wt. % butadiene units which are hydroxybrominated and from 50 to 98 wt. % butadiene units which are brominated, and has a 5% weight loss temperature of at least 250° C.

The flame retardant known from WO2016123263 (D3) possesses low thermal stability that becomes apparent under high processing temperatures of the expandable polystyrene, and also the absence of functional groups capable of absorbing the HBr released under high temperatures.

In addition to this, the process for preparing a flame retardant proposed according to the known invention is characterized by large amount of time spent in the step of preparing a hydroxybrominated styrene-butadiene copolymer, and in the step of it's isolation from a reaction mass, and also the necessity of the use of expensive reagents, in particular, N-haloimide.

Furthermore, patent RU2530021 (D5) selected by the authors as the prototype of the present invention discloses the use of brominated and epoxidized styrene-butadiene copolymer as a flame retardant for the expandable polystyrene.

In accordance with D5, the flame retardant is obtained by a method comprising the epoxidation step and bromination step to obtain a brominated and epoxidized styrene-butadiene copolymer. The flame retardant obtained in accordance with the known invention is characterized by a molecular weight of at least 1500 g/mol, the bromine content of at least 35 wt. % and a 5% weight loss temperature of at least 180° C.

However, although the flame retardant comprises epoxy groups capable to absorb HBr released under high processing temperatures of polymer compositions comprising expandable polystyrene, the low compatibility of the flame retardant with polystyrene is observed.

Regardless of the fact that the prior art discloses the effective method of producing brominated flame retardants with the use, in particular, quaternary ammonium tribromides, that allows to avoid of the formation of tertiary bromides in the molecule of the flame retardant (see D5), the authors of the present invention have surprisingly established that the method described in known prior art results in the formation of bromine atoms in an allyl position to double bonds of diene moieties (allyl bromides), and these allyl and tertiary bromides as it is known also have the negative influence on the thermal stability of the obtained flame retardants which is confirmed by examples showing the present invention.

Thus, flame retardants comprising diene-containing (co)polymers and methods of preparing them known from prior art are not enough effective and also require great economical and time costs.

In view of this, the strategic pathway is the development of a flame retardant comprising a diene-containing (co)polymer that will be thermostable, including due to the reduced content, preferably full lack of tertiary and/or allyl halogenides, will meet environmental friendliness requirements, and also will not adversely affect a process of the polymerization and the formation of polystyrene granules, wherein will provide the excellent flame retardant properties for polystyrene, including expandable polystyrene.

SUMMARY OF THE INVENTION

It is an object of the present invention to develop a modified diene-containing (co)polymer that may be used as a flame retardant, and also a method for producing it, and use thereof as a flame retardant for the expandable polystyrene.

The technical result of the present invention is the preparation of a modified diene-containing (co)polymer characterized by high thermal stability, namely a 5% weight loss temperature of at least 180° C., a molecular weight of at least 1500 g/mol and a halogen content of at least 35 wt. %, by a content of tertiary and/or allyl halogenides in the range from 0 to less than 1.5 wt. %, that does not adversely affect a process of the polymerization and the formation of polystyrene granules, and also allow to obtain polystyrene granules having the yellowness index from 2 to 6 units, comparable with the yellowness index of polystyrene granules containing HBCD (from 0 to 3 units) as it is defined below.

The indicated technical result is achieved due to a modified diene-containing (co)polymer comprising epoxy groups, hydroxyl groups, and also halogen atoms, and that is substantially free of tertiary and/or allyl halogenides that may be obtained by reacting a starting diene-containing (co)polymer and a halogenating agent in the presence of water in an admissible amount from 0 to less than 0.5 w. %, followed by reacting with a modifying system comprising halogen and water, in the presence of an aliphatic alcohol.

Authors of the present invention have surprisingly discovered that the modified diene-containing (co)polymer comprising epoxy groups, hydroxyl groups, and also halogen atoms, comprising tertiary and/or allyl halogenides in the range from 0 to less than 1.5 wt. %, more preferably from 0 to less than 1.0 wt. %, even more preferably from 0 to less than 0.5 wt. %, is thermostable, does not adversely affect a process of the polymerization and the formation of polystyrene granules, and allows to obtain polystyrene granules having the yellowness index from 2 to 6 units, preferably less than 6 units, more preferably less than 5 units, the most preferably less than 3 units, comparable with the yellowness index of polystyrene granules containing HBCD (from 0 to 3 units).

Furthermore, the authors of the present invention have discovered that the indicated modified diene-containing (co)polymer may be obtained by a method comprising a halogenation step with the use of a halogenating agent under the substantial absence of water in a reaction system, in particular, the admissible water content in the system is from 0 to less than 0.5 wt. %, followed by the conduction of the modification step using as a modifying system a mixture of halogen and water in the presence of an aliphatic alcohol. Hypothetically, the presence of the significant amount of water in the system at the halogenation step results in the formation of allyl halogenides which in turn results in lowering the thermal stability of the obtained modified diene-containing (co)polymer.

Furthermore, the claimed method allows to incorporate into the structure of the starting (co)polymer hydroxyl groups and halogen atoms followed by partial proceeding the dehydrohalogenation reaction to form epoxy groups in the (co)polymer structure.

The modified diene-containing (co)polymer obtained in accordance with the present invention and comprising epoxy and hydroxyl groups, and also halogen atoms, and characterized by the presence of tertiary and/or allyl halogenides in the range from 0 to less than 1.5 wt. % may be used as the flame retardant in different polymer compositions, e.g., polymer compositions comprising polystyrene, including expandable polystyrene.

DESCRIPTION OF THE DRAWINGS

To illustrate the technical solutions that reveal the essence of the present invention.

FIG. 1 is a flowchart showing the sequence of steps of producing a modified diene-containing (co)polymer in accordance with the present invention.

FIG. 2 shows the $^1$H NMR spectrum of a modified diene-containing (co)polymer that comprises epoxy groups, hydroxyl groups and halogen atoms, and is free of tertiary and allyl bromides, obtained in accordance with the present invention.

FIG. 3 shows the $^1$H NMR spectrum of a styrene-butadiene copolymer containing epoxy groups, hydroxyl groups and halogen atoms, and also containing an allyl bromide.

absence of tertiary and/or allyl halogenides in the molecule of the obtained modified diene-containing (co)polymer, i.e. the most preferable content of tertiary and/or allyl halogenides is 0 wt. %.

The term "thermal stability" in the present invention means a 5% weight loss temperature of the modified diene-containing (co)polymer, defined by the thermogravimetric analysis (TGA) method described below.

The thermostable modified diene-containing (co)polymer obtained in accordance with the invention comprises at least one epoxy group, wherein an amount of epoxy groups in the obtained modified diene-containing (co)polymer is from 0.01 to 5 wt. %, preferably from 0.05 to 3 wt. %, more preferably from 1 to 2 wt. %.

The obtained thermostable modified diene-containing (co)polymer comprises at least one hydroxyl group, wherein an amount of hydroxyl groups in the obtained modified diene-containing (co)polymer is from 0.05 to 5 wt. %, preferably from 0.1 to 3 wt. %, more preferably from 0.15 to 1 wt. %.

In accordance with the present invention, the 5% weight loss temperature of the modified diene-containing (co)polymer is at least 180° C., preferably at least 220° C., more preferably at least 240° C.

In one embodiment of the present invention the modified diene-containing (co)polymer represents, but is not limited to it, a modified diene-containing (co)polymer of the general formula (1):

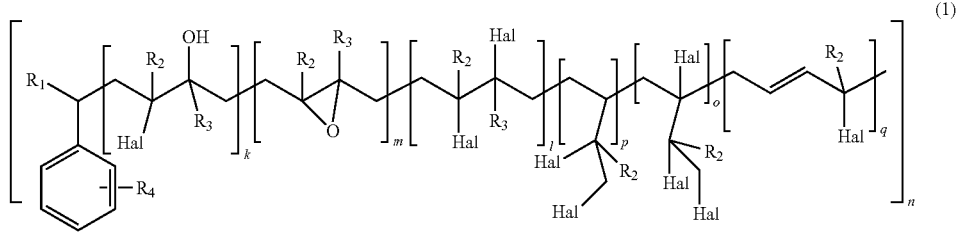

Figure 4:
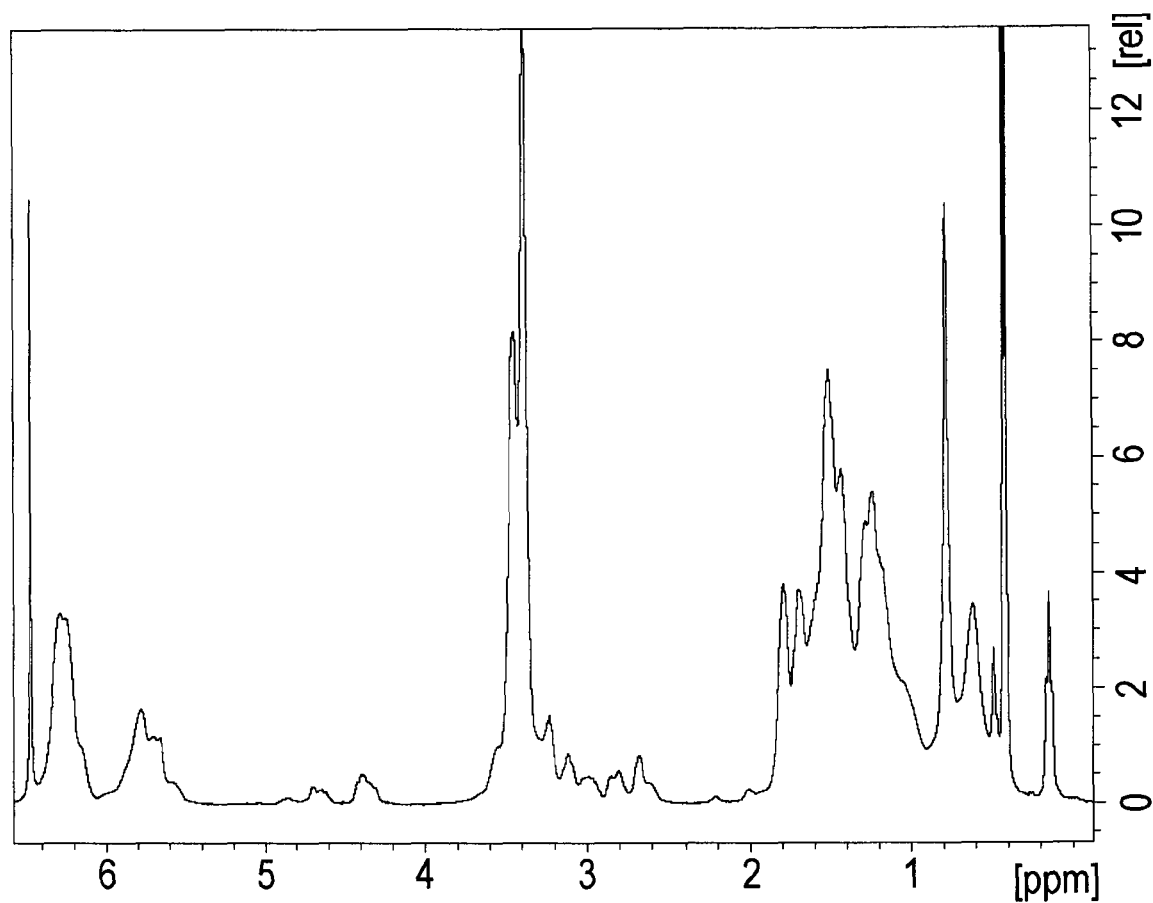

FIG. 4 shows the $^1$H NMR spectrum of the obtained styrene-butadiene copolymer containing epoxy groups, hydroxyl groups and halogen atoms, and also containing a tertiary bromide.

DESCRIPTION OF THE INVENTION

The present invention relates to a modified diene-containing (co)polymer representing a thermostable modified diene-containing (co)polymer that is characterized by a weight-average molecular weight of at least 1500 g/mol, preferably from 2000 to 280000 g/mol, more preferably from 10000 to 150000 g/mol, the most preferably from 60000 to 100000 g/mol, and also by a majority of unconjugated carbon-carbon double bonds, wherein at least two double bonds (but less than all the unconjugated carbon-carbon double bonds) are modified and the modified diene-containing (co)polymer comprises at least 35 wt. %, preferably at least 60 wt. %, more preferably at least 75 wt. % of halogen, at least one epoxidized unconjugated carbon-carbon double bond, and at least one hydroxyhalogenated unconjugated carbon-carbon double bond.

At the same time, the distinctive peculiarity of the modified diene-containing (co)polymer obtained in accordance with the present invention is the low content of tertiary and/or allyl halogenides in the range from 0 to less than 1.5 wt. %, more preferably from 0 to 1.0 wt. %, more preferably from 0 to less than 0.5 wt. %, even more preferable the full wherein $R_1$-$R_4$ are the same or different and may represent hydrogen or a hydrocarbon group having from 1 to 6 carbon atoms, in particular, an alkyl group; Hal is halogen; n—a quantity of polymer chain units that is 1<n<400, preferably 100<n<350, more preferably 140<n<250; k, m, l, p, o, q may be the same or different and constitute 1<k<37, 0<m<19, 2<(l+p)<3660, 0<o<8, 0<q<8, preferably 6<k<12, 3<m<6, 610<(l+p)<1220, 0<o<5, 0<q<5, more preferably 7<k<10, 4<m<5, 730<(l+p)<980, o=0, q=0.

In accordance with the present invention, the modified diene-containing (co)polymer wherein tertiary and/or allyl halogenides are presented in the range from 0 to less than 1.5 wt. %, more preferably from 0 to less than 1.0 wt. %, the most preferably from 0 to less than 0.5 wt. %, is obtained by conducting a halogenation step using a halogenating agent under the substantial absence of water in the system. Within the scope of the present application "the substantial absence of water" means that the admissible amount of water in the system ranges from 0 to less than 0.5 wt. %, more preferably from 0 to less than 0.3 wt. %, even more preferably from 0 to less than 0.1 wt. %, followed by conducting the modification step with the use as a modifying system of a mixture of halogen and water in the presence of an aliphatic alcohol.

The indicated halogen atom in the structure of the modified diene-containing (co)polymer according to the present invention is selected from the group consisting of chlorine, bromine or iodine. The most preferably, the modified diene-containing (co)polymer comprises bromine atoms as halogen.

The present invention is in the other aspect a method for producing a modified diene-containing (co)polymer comprising the following steps of:
a) dissolution step comprising (optionally) preliminary grinding a starting diene-containing (co)polymer followed by dissolving in an organic solvent;
b) partial halogenation step, using a halogenating agent and optionally an aliphatic alcohol to a halogenation degree of at least 60%, preferably more at least 90%, the most preferably at least 95%;
c) washing and separation step, comprising adding water to the reaction mass obtained in step b) and separating an aqueous layer and an organic layer;
d) modification step, comprising adding components of a modifying system and optionally an aliphatic alcohol to the organic layer obtained in step c) comprising a partially halogenated diene-containing (co)polymer;
e) neutralization and separation step, comprising adding an aqueous solution of a neutralizing agent to the reaction mass obtained in step d) and separating an aqueous layer and an organic layer;
f) isolation step, comprising precipitating or degassing a modified diene-containing (co)polymer;
g) filtration and the subsequent drying step of the isolated modified diene-containing (co)polymer,
wherein in the step b) of partial halogenation the admissible water content in the system is from 0 to less than 0.5 wt. %, more preferably from 0 to less than 0.3 wt. %, even more preferably from 0 to less than 0.1 wt. %, and in the step d) of modification a mixture of halogen and water is used in a halogen:water ratio from 1:0.01 to 1:1, preferably from 1:0.5 to 1:0.7, more preferably from 1:0.25 to 1:0.7 per the total amount of double bonds in the starting (co) polymer is used as the modifying system.

Dissolution Step a)

In step a) of the claimed method, optionally the preliminary grinding of a starting diene-containing (co)polymer is carried out, followed by the dissolution thereof in an organic solvent while stirring.

The starting diene-containing (co)polymer according to the present invention is a polymer or copolymer of a conjugated diene.

The preferable conjugated dienes are conjugated dienes having from 4 to 12 carbon atoms, e.g., selected from the group consisting of 1,3-butadiene, 2-methyl-1,3-butadiene (isoprene), 2-ethyl-1,3-butadiene, 2,3-di(C1-C5 alkyl)-1,3-butadienes, such as 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, 2-methyl-pentadiene, 4-methyl-pentadiene, or mixtures thereof. Preferably, 1,3-butadiene or isoprene are used.

Suitable comonomers in the starting diene-containing (co)polymer according to the present invention are vinylaromatic compounds selected from the group consisting of styrene, α-methylstyrene, ortho-, meta- and para-methylstyrene, 3-vinyltoluene, ethylvinyl benzene, 4-cyclohexylstyrene, para-tert-butylstyrene, methoxystyrenes, vinyl mesitylene, divinylbenzene, 1-vinylnaphthalene, 2,4,6-trimethylstyrene, or a mixture thereof. Preferably, styrene or α-methylstyrene are used.

Suitable polymers and copolymers of the conjugated diene comprise at least 30 wt. %, preferably at least 50 wt. %, more preferably 70 wt. % of polymerized units of the conjugated diene.

Preferably, butadiene, styrene-butadiene and styrene-butadiene-isoprene (co)polymers, the most preferably—styrene-butadiene copolymer that is di- and tri-block-copolymers of butadiene and styrene are used as the starting diene-containing (co)polymer.

Examples of commercially available diene-containing (co)polymers are, but are not limited to them, butadiene polymers with trade names BR-1243 Nd grade B (LP), BR-1243 Nd grade B, BR-1243 ND HV; styrene and butadiene block copolymers with trade names DST R 30-00, SBS L 30-01A, SBS R 30-00A, DST L 30-01, DST L 30-01 (SR); styrene-butadiene copolymers obtained by the solution polymerization method, with the trade names DSSK-2560-M27 (grade AA), DSSK-2560-M27 BB (grade A), DSSK-4040-M27 (grade A) of the PJC SIBUR-Holding manufacture.

Suitable starting diene-containing (co)polymers according to the present invention have an average molecular weight of at least 700 g/mol, preferably from 1000 to 400000 g/mol, more preferably from 2000 to 300000 g/mol, more preferably from 5000 to 200000 g/mol, more preferably from 20000 to 120000 g/mol, the most preferably from 20000 to 50000 g/mol, and are characterized by a polydispersity index from 0.8 to 3, more preferably from 1 to 1.8, the most preferably from 1.1 to 1.5, and by a quantity of 1,2-units that is at least from 10 to 100 wt. %, preferably at least from 50 to 99 wt. %, more preferably from 60 to 80 wt. % per the polybutadiene part of the (co)polymer.

The starting diene-containing (co)polymer is optionally ground by any method known from the prior art method, for example, using (knife, hummer, or rotor) grinders, (fluid or screw) millers, etc., but is not limited to them.

Upon the dissolution of the starting diene-containing (co)polymer in step a) the stirring is performed by any method known from prior art, e.g., using a device equipped with a mixer, static mixer, at a temperature from 10 to 50° C., preferably from 15 to 40° C., more preferably from 20 to 30° C.

Suitable solvents are, but are not limited to them, organic solvents, preferably having a purity of 99% and more, representing ethers, e.g., tetrahydrofuran, halogenated saturated aliphatic hydrocarbons, e.g., carbon tetrachloride, chloroform, dibromomethane, dichloromethane, 1,2-dichloroethane, cycloaliphatic hydrocarbons, e.g., cyclohexane, aromatic hydrocarbons, e.g., toluene, halogenated aromatic hydrocarbons, e.g., bromobenzene, chlorobenzene and dichlorobenzene. The preferable organic solvents are those that are liquid under conditions of the modification of the starting diene-containing (co)polymer, and that do not react with the modifying system or the starting (co)polymer. Preferably, tetrahydrofuran, chloroform, dichloromethane, dichloroethane, cyclohexane, toluene are used as the solvent; the most preferably tetrahydrofuran, chloroform, dichloromethane are used.

A mass ratio of the organic solvent to the starting diene-containing (co)polymer is from 5:1 to 30:1, preferably from 8:1 to 20:1, more preferably from 10:1 to 15:1.

The time of the dissolution process is at most 60 minutes, in particular, at most 50 minutes, preferably at most 40 minutes, at most 30 minutes, at most 25 minutes, at most 20 minutes, at most 15 minutes, at most 13 minutes, at most 11 minutes, at most 9 minutes, at most 7 minutes, at most 5 minutes.

The mass obtained as the result of the dissolution step a) described above is a solution of the starting diene-containing (co)polymer in the organic solvent.

Partial Halogenation Step b)

In the partial halogenation step b) the addition of a halogenating agent and optionally an aliphatic alcohol to a starting diene-containing (co)polymer solution obtained in step a) is performed.

A halogenation degree of the partially halogenated diene-containing (co)polymer obtained in step b) is at least 60%, preferably at least 90%, more preferably at least 95%.

The partial halogenation step b) is performed substantially in the absence of water in a system, wherein it should be understood under the substantial absence of water that the admissible water content is from 0 to less than 0.5 wt. %, more preferably from 0 to less than 0.3 wt. %, even more preferably from 0 to less than 0.1 wt. %.

Chlorine, bromine and iodine are used as the halogen in a halogenating agent in step b).

Preferably, elemental bromine ($Br_2$) as such, and also in the form of a solution in the organic solvent with a bromine content of not more than 70 wt. %, more preferably not more than 60 wt. %, even more preferably not more than 50 wt. %, is used as the halogenating agent.

In addition, suitable halogenating agents are, but are not limited to them, quaternary ammonium bromides, e.g., phenyltriethylammonium bromide, benzyltrimethylammonium bromide, tetramethylammonium bromide, tetraethylammonium bromide, tetrapropylammonium bromide, tetra-n-butylammonium bromide, and quaternary phosphonium bromides, e.g., tetramethylphosphonium bromide, tetraethylphosphonium bromide, tetrapropylphosphonium bromide, tetra-n-butylphosphonium tribromide, or mixtures thereof.

Preferably, a mixture of elemental bromine ($Br_2$) and quaternary ammonium bromides or quaternary phosphonium bromides is used as the halogenating agent. At the same time, the use of quaternary ammonium bromide or quaternary phosphonium bromide allows to avoid the substantial substitution of hydrogen with bromine in tertiary and/or allyl carbon atoms, which in turn has an influence on the thermostability of the obtained modified diene-containing (co)polymer.

As an aliphatic alcohol, alcohols having from 1 to 6 carbon atoms, such as methanol, ethanol, propanol, iso-propanol, butanol, iso-butanol, pentanol, hexanol, but are not limited to them, are used. Preferably, as the aliphatic alcohol, propanol, butanol, iso-butanol, pentanol are used; more preferably butanol, iso-butanol and pentanol are used.

A molar ratio of a starting diene-containing (co)polymer:a halogenating agent:an aliphatic alcohol in step b) is from 1:1.5:3 to 1:5:3, more preferably from 1:2:3 to 1:4:3, the most preferably from 1:2.5:3 to 1:3:3. Moreover, in the case of using the mixture of elemental bromine and quaternary ammonium bromide or quaternary phosphonium bromide as the halogenating agent, a molar ratio of elemental bromine: bromine atoms in the quaternary ammonium bromide or quaternary phosphonium bromide is from 1:1 to 1:4, more preferably from 1:2 to 1:3, most preferably from 1:1 to 1:1.5.

The addition of the halogenating agent and an aliphatic alcohol, if it is used, to the solution of the starting diene-containing (co)polymer obtained in step a) can be performed in any order. Preferably, the aliphatic alcohol is added first to the starting diene containing (co)polymer solution, followed by the addition of the halogenating agent. At the same time, upon the combination use of a quaternary ammonium bromide or quaternary phosphonium bromide and elemental bromine as the halogenating agent, the whole mass of quaternary ammonium bromide or quaternary phosphonium bromide in the form of a solution thereof in an organic solvent is immediately added to the reaction mass.

Preferably, the addition of elemental bromine in the partial halogenation step b) is performed in the form of the solution thereof in the organic solvent by dosing the solution to the reaction mass with a rate ranging between 0.80 and 50 ml/min, preferably between 1 and 10 ml/min, more preferably between 1.5 and 5 ml/min. A very high dosing rate results in local overheating of the reaction mass, the increase in viscosity thereof, which in turn may result in the preparation of the modified diene-containing (co)polymer with a low (less than 35 wt. %) halogen atom content.

The addition of the whole volume of the elemental bromine ($Br_2$) solution to the solution of the starting diene-containing (co)polymer obtained in step a) may also result in its crosslinking, to local overheating of the reaction mass, to the increase in the viscosity of the reaction mass, which may also result in the preparation of the modified diene-containing (co)polymer with a low (less than 35 wt. %) halogen atom content.

The halogenating agent may be dissolved in the organic solvent or a mixture thereof, preferably having the purity of 99% and more, and representing ether, e.g., tetrahydrofuran, halogenated saturated aliphatic hydrocarbons, e.g., chloroform, dibromomethane, dichloromethane, 1,2-dichloroethane, cycloaliphatic hydrocarbons, e.g., cyclohexane, aromatic hydrocarbons, e.g., toluene, halogenated aromatic hydrocarbons, e.g., bromobenzene, chlorobenzene and dichlorobenzene. Preferably, the halogenating agent is added in the form of a solution thereof in the same solvent that was used in step a) to dissolve the starting diene-containing (co)polymer.

The partial halogenation step b) is carried out in any batch or continuous equipment known from the prior art. The suitable equipment is, but is not limited to, a continuous stirred tank reactor, a batch stirred tank reactor, an autoclave with a mixer, which are designed to work with highly corrosive media.

Preferably, the partial halogenation step of the solution of the starting diene-containing (co)polymer obtained in step a) is carried out without exposure to light, e.g., by carrying out the modification process in dark glass vessels, by wrapping the reactor with foil, or by carrying out the process in metal reactors to reduce the probability of non-selective photo-catalytic halogenation reactions.

The partial halogenation step b) is carried out at a temperature of from 0 to 50° C., preferably from 20 to 45° C., more preferably from 30 to 40° C., and under atmospheric pressure.

The stirring rate of the reaction mass after the addition of the halogenating agent is from 50 to 600 rpm, preferably from 100 to 500 rpm, more preferably from 200 to 300 rpm.

The partial halogenation step b) can be carried out for any time sufficient to achieve the required halogenation degree of the starting diene-containing (co)polymer, as described above. Preferably, the time of the partial halogenation step b) is at least 15 minutes, at least 20 minutes, at least 25 minutes, at least 30 minutes, at least 45 minutes, at least 60 minutes, at least 120 minutes.

Washing and Separation Step c)

Step c) includes washing the obtained in step b) reaction mass containing the partially halogenated diene-containing (co)polymer, by adding water, followed by separating an aqueous layer and an organic layer containing the partially halogenated diene-containing (co)polymer.

In the context of the present invention, water is, but is not limited to, distilled, deionized, demineralized, osmotic, bidistilled water.

The washing by water is carried out using at least one-fold, preferably at least two-fold, more preferably at least three-fold excess of water relative to the volume of the reaction mass, as a result of which the reaction mass is separated into two layers: the organic layer containing the partially halogenated diene-containing (co)polymer and the aqueous layer.

In this case, the permissible residual content of the halogenating agent in the organic layer after washing with water in step c) is from 0 to 0.5 wt. %, preferably from 0 to 0.1 wt. %, more preferably from 0 to 0.01 wt. %.

Preferably, the washing process is carried out at a temperature of from 15 to 50° C., preferably from 20 to 40° C., more preferably from 25 to 30° C., and under atmospheric pressure.

The separation of the organic layer and aqueous layer is carried out using any equipment known from the prior art, e.g., using a separating funnel, separator, settling tank.

Modification Step d)

In the modification step d) components of a modifying system are added to the obtained in step c) organic layer containing a partially halogenated diene-containing (co)polymer.

In accordance with the present invention, halogen and water are used together as the modifying system in the presence of an aliphatic alcohol in a mass ratio of halogen: water from 1:0.01 to 1:1, preferably from 1:0.5 to 1:0.7, the most preferably from 1:0.25 to 1:0.7, based on the total number of double bonds in the starting diene-containing (co)polymer.

Chlorine, bromine or iodine is used as the halogen. It is preferable to use as the halogen elemental bromine ($Br_2$) as such, and also in the form of a solution in an organic solvent with a bromine content of not more than 70 wt. %, more preferably not more than 60 wt. %, the most preferably not more than 50 wt. %.

In the context of the present invention, water is, but is not limited to, distilled, deionized, demineralized, osmotic, bidistilled water.

Alcohols having from 1 to 6 carbon atoms such as methanol, ethanol, propanol, iso-propanol, butanol, iso-butanol, pentanol, hexanol, are used as the aliphatic alcohol, but are not limited to them, in the formulation of the modifying system in step d). Preferably, propanol, butanol, iso-butanol, pentanol are used as the aliphatic alcohol; more preferably—butanol, iso-butanol and pentanol are used.

A partially halogenated diene-containing (co)polymer: modifying system:aliphatic alcohol ratio in stage d) is from 1:1.5:3 to 1:5:3, more preferably from 1:2:3 to 1:4:3, the most preferably from 1:2.5:3 to 1:3:3.

The order of the addition of the components of the modifying system and the aliphatic alcohol to the partially halogenated diene-containing (co)polymer solution may be any one. Preferably, the aliphatic alcohol is added first to the partially halogenated diene-containing (co)polymer solution, followed by the addition of water, or vice versa.

Preferably the addition of halogen to the partially halogenated diene-containing (co)polymer solution is carried out by dosing the solution in the organic solvent into the reaction mass. Halogen can be dissolved in an organic solvent or a mixture of organic solvents, preferably having a purity of 99% or more, and representing an ether, e.g., tetrahydrofuran, a halogenated saturated aliphatic hydrocarbon, e.g., chloroform, dibromomethane, dichloromethane, 1,2-dichloroethane, cycloaliphatic hydrocarbon, e.g., cyclohexane, an aromatic hydrocarbon, e.g., toluene, a halogenated aromatic hydrocarbon, e.g., bromobenzene, chlorobenzene and dichlorobenzene. Preferably, the halogen is dosed in the form of the solution thereof in the same solvent that was used in step a) to dissolve the starting diene-containing (co)polymer.

In one of the embodiments of the invention, the halogen is introduced into the reaction mass in the form of a solution in an organic solvent, as described above, after pre-mixing such a solution with water.

The dosing rate of the halogen solution or a mixture of halogen solution and water is from 0.80 to 50 ml/min, preferably from 1 to 10 ml/min, more preferably from 1.5 to 5 ml/min. A very high dosing rate results in local overheating of the reaction mass, the increase in the viscosity thereof, which in turn may result in the preparation of the modified diene-containing (co)polymer with a low (less than 35 wt. %) halogen atom content.

The one-time addition of the total volume of the halogen solution to the starting diene-containing (co)polymer solution may result in the crosslinking thereof, to local overheating of the reaction mass, to the increase in the viscosity of the reaction mass, which may also result in the preparation of the modified diene-containing (co)polymer with a low (less than 35 wt. %) halogen atom content.

The modification step d) is carried out in any batch or continuous equipment known from the prior art. The suitable equipment is, but is not limited to, a continuous stirred tank reactor, a batch stirred tank reactor, an autoclave with a mixer, which are designed to work with highly corrosive media.

Preferably, the modification step d) of the partial halogenated diene-containing (co)polymer is carried out without exposure to light, e.g., by carrying out the modification process in dark glass vessels, by wrapping the reactor with foil, or by carrying out the process in metal reactors to reduce the probability of non-selective photocatalytic halogenation reactions.

The modification step d) is carried out at a temperature of from 0 to 50° C., preferably from 20 to 45° C., more preferably from 30 to 40° C., and under atmospheric pressure.

The stirring rate of the reaction mass after adding the modifying system is from 50 to 600 rpm, preferably from 100 to 500 rpm, more preferably from 200 to 300 rpm.

The modification step d) can be carried out for any time sufficient to achieve the required modification degree of the partially halogenated diene-containing (co)polymer, as described above. Preferably, the time of the modification step d) is at least 15 minutes, at least 20 minutes, at least 25 minutes, at least 30 minutes, at least 45 minutes, at least 60 minutes, at least 120 minutes.

The mass obtained after the modification step d) contains the target product, namely the modified diene-containing (co)polymer.

Neutralization and Separation Step e)

Step e) involves the neutralization of the obtained in step d) reaction mass containing the modified diene-containing (co)polymer, by adding a solution of a neutralizing agent, followed by washing the neutralized reaction mass with water and separating an aqueous layer and an organic layer containing the modified diene-containing (co)polymer.

As the neutralizing agent in step e), aqueous base solutions known from the prior art are used, e.g., aqueous solutions of sodium hydroxide, sodium thiosulfate, sodium bisulfite, sodium carbonate, but are not limited to them. Preferably, the aqueous solution of sodium hydroxide is used.

A molar ratio of an amount of the neutralizing agent to an amount of halogen added in step d) usually is from 1:1 to 3:1, preferably from 1:1 to 2:1, more preferably 1:1.

Preferably, the neutralization process is carried out at a temperature of from 15 to 50° C., preferably from 20 to 40° C., more preferably from 25 to 30° C., and under atmospheric pressure.

The washing with water is carried out using at least one-fold, preferably at least two-fold, more preferably at least three-fold excess of water relative to the volume of the reaction mass subjected to the neutralization, resulting in the separation of the reaction mass into two layers—an organic layer containing a modified diene-containing (co)polymer, and an aqueous layer.

The separation of the organic layer and aqueous layer is carried out using any equipment known from the prior art, e.g., using a separating funnel, separator, settling tank.

Isolation Step f)

In the embodiment of the present invention which involves the precipitation of the resulting modified diene-containing (co)polymer in the isolation step f), an alcohol-precipitant is added to organic layer containing modified diene-containing (co)polymer in a mass ratio of an alcohol-precipitant:a modified (co)polymer within the range from 15:1 to 1:1, preferably from 10:1 to 3:1, more preferably from 5:1 to 4:1.

Suitable alcohols-precipitants used in step f) are, but are not limited to, aliphatic alcohols having from 1 to 4 carbon atoms. Examples of these alcohols are, but are not limited to, methanol, ethanol, propanol, iso-propanol, butanol, iso-butanol. Preferably, methanol and ethanol are used as the alcohol-precipitant.

In another embodiment of the present invention, which involves degassing the resulting modified diene-containing (co)polymer in the isolation step f), water is added to the organic layer obtained in step e), followed by distilling off a water-solvent mixture at a high temperature and under reduced pressure in order to isolate the target modified diene-containing (co)polymer and remove therefrom water and/or vapors thereof, the solvent and/or vapors thereof.

In the context of the present invention, water is, but is not limited to, distilled, deionized, demineralized, osmotic, bidistilled water.

In this case, the volume ratio of the added water to the organic layer in the isolation step is from 5:1 to 0.1:1, preferably from 3:1 to 1:1, more preferably 2:1.

In accordance with the present invention, the temperature of water when it is added to the system in step f) is not more than 30° C., preferably not more than 25° C., more preferably not more than 20° C. When using water having a temperature above 30° C., there is the boiling and the subsequent abrupt evaporation of the solvent, which often results in the undesirable change in the physical and mechanical characteristics of the resulting modified diene-containing (co)polymer.

The degassing in step f) is carried out in any suitable equipment known from prior art, in particular, in apparatuses that provide good mixing, heat exchange and the maintenance of the reduced pressure. Examples of these apparatuses are, but are not limited to, continuous or batch apparatuses equipped with a jacket and mixer.

The temperature of the degassing step is from 20 to 150° C., preferably from 50 to 100° C., the most preferably from 80 to 95° C.

The pressure in the degassing step is maintained at the level of less than 800 mbar, preferably less than 300 mbar, more preferably less than 100 mbar.

Preferably, the duration of the degassing step in step is at least 30 minutes, more preferably at least 60 minutes, the most preferably at least 120 minutes.

After carrying out the isolation step the filtration and drying step of the target modified diene-containing (co) polymer is performed.

Filtration and Drying Step g)

At the filtration and drying step g), in order to purify the modified diene-containing (co)polymer from residues of the solvent and alcohol-precipitant, the filtration is carried out in any apparatuses known from the prior art, e.g., in filters equipped with porous filter partitions, nutsch-filters and similar devices.

The filtration of the modified diene-containing (co)polymer is carried out at a temperature of from 20 to 40° C. inclusive.

In order to remove from the resulting modified diene-containing (co)polymer residues of water and/or vapors thereof, a solvent and/or vapors thereof, said (co)polymer is dried. The process of drying the modified diene-containing (co)polymer can be performed by physical methods commonly used for separating and purifying organic substances (distilling off the solvent under the reduced pressure, drying in a vacuum drying oven), as well as using drying agents that remove moisture due to adsorption, the hydrate formation or a chemical reaction with water and solvents.

Preferably, the drying is carried out at a temperature of from 50 to 105° C. and a pressure of from 1 to 20 kPa.

Figure 1:
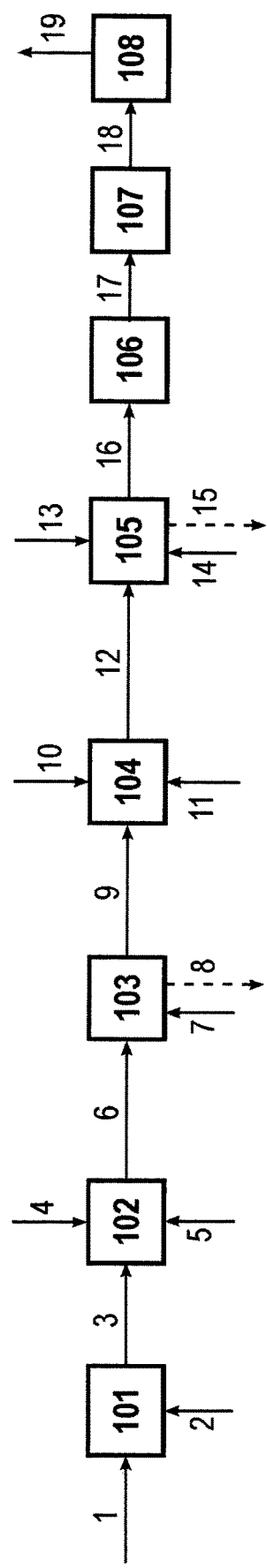
FIGS. 1-4 are presented.

The invention is clarified in FIG. 1 that shows a flowchart of preparing a modified diene-containing (co)polymer, wherein 101 is a dissolution unit of a starting diene-containing (co)polymer, 102 is a partial halogenation unit of the dissolved starting diene-containing (co)polymer, 103 is a washing and separation unit, 104 is a modification unit of a partially halogenated diene-containing (co)polymer, 105 is a neutralization and separation unit, 106 is an isolation unit, 107 is a filtration unit, 108 is a drying unit.

According to the presented method, the grinded, if necessary, starting diene-containing (co)polymer (1) is fed to the dissolution unit 101, where it is admixed with an organic solvent (2) to obtain a solution of the starting diene-containing (co)polymer (3). Next, said (co)polymer solution (3) goes into the partial halogenation unit 102, into which a halogenating agent (4) and, optionally, an aliphatic alcohol (5) are also supplied. After that, the partially halogenated diene-containing (co)polymer (6) obtained in the unit 102 is directed to the washing and separating unit 103, into which water (7) is fed, after which the separation of the organic layer (9) containing the partially halogenated diene-containing (co)polymer and an aqueous layer (8) is performed. Next, the organic layer (9) containing the partially halogenated diene-containing (co)polymer goes into the modification unit 104, into which a modifying system (10) and an aliphatic alcohol (11) are also fed. After this, the modified diene-containing (co)polymer (12) obtained in the unit 104 is sent to the neutralization and separation unit 105, which is supplied with a neutralizing agent (15) followed by water supply (14) for washing the neutralized reaction mass, after which the separation of the organic layer (16) containing the modified diene-containing (co)polymer and the aqueous layer (15) is performed. Then the organic layer (16) containing the modified diene-containing (co)polymer goes into the isolation unit 106 to isolate the modified diene-containing (co)polymer. Next, the isolated modified diene-containing (co)polymer sequentially (17, 18) is fed to the filtration unit 107 and to the drying unit 108 to obtain the final product, namely the modified diene-containing (co)polymer (19). The method of preparing the modified diene-containing (co)polymer may also comprise an organic solvent regeneration unit with its subsequent recirculation into the dissolution unit 101 of the starting diene-containing (co) polymer (is not shown in FIG. 1).

The flowchart presented in FIG. 1 is the example of the embodiment of the present invention and does not limit it.

The one more aspect of the present invention is the use of the modified diene-containing (co)polymer obtained in accordance with the present invention as a flame retardant in various polymers and polymer compositions, e.g., based on expandable polystyrene, to impart them flame retardant properties. In this case, the flame retardants are compatible with the polymer or the polymer composition.

In accordance with the present invention, the modified diene-containing (co)polymer is introduced into the expandable polystyrene at the step of the preparation thereof according to a method comprising the production of polystyrene by the polymerization of styrene in the presence of a polymerization initiator, a polymerization stabilizer and other technological additives, followed by expanding of the prepared polystyrene (see, e.g., patent U.S. Pat. No. 5,086, 078).

At the same time, an amount of the modified diene-containing (co)polymer used as the flame retardant should not be less than 0.5 weight parts, preferably not less than 0.7 weight parts, more preferably not less than 1 weight part, otherwise the efficiency of improving the flame retardant characteristics of the resulting expandable polystyrene reduces.

Furthermore, one more aspect of the present invention is the expandable polystyrene that includes traditional additives ensuring the achievement of the necessary complex of technological, physical-mechanical and operational characteristics, such as antistatic agents, stabilizers, dyes, lubricants, fillers, and adhesion reducing agents.

In accordance with the present invention, expandable polystyrenes are used for the production of a wide range of articles, such as building heat and sound insulation, in particular, heat and sound insulation plates, fixed formwork, components for automobiles, floating articles, as well as raw materials for polystyrene foam blocks required in the construction of roads and bridges, the package of household appliances. Such expandable polystyrenes contain as a flame retardant the modified diene-containing (co)polymer according to the present invention, since said modified diene-containing (co)polymer is characterized by high thermostability, in particular, a 5% weight loss temperature of at least 180° C., measured by the thermogravimetric analysis method, does not affect the polymerization process and the formation of polystyrene granules, which is confirmed by particle size distribution of the prepared polystyrene. In addition, the flame retardant obtained in accordance with the present invention imparts flame retardant properties to the expandable polystyrene and does not affect the remaining characteristics and properties thereof.

The modified diene-containing (co)polymer obtained according to the present invention also allows to obtain polystyrene granules with a yellowness index of from 2 to 6 units, preferably less than 6 units, more preferably less than 5 units, the most preferably less than 3 units, comparable to the yellowness index of polystyrene granules containing HBCD (from 0 to 3 units). The method for determining the yellowness index of polystyrene granules is presented below.

Furthermore, the flame retardant obtained in accordance with the present invention imparts flame retardant properties to the expandable polystyrene, which makes it possible to classify the expandable polystyrene, which contains the flame retardant proposed in accordance with the present invention, to moderate flammable materials with flammability class B2 (in accordance with clause 7 of article 13 of the "Technical Rules on Flame Safety Requirements" (Federal Act No. 123 dated Jul. 22, 2008, as amended on Jul. 29, 2017).

The invention is more specifically described in examples below. These examples are given only to illustrate the present invention and do not limit it.

EMBODIMENTS OF THE INVENTION

Research Methods of a Modified Diene-Containing (Co) Polymer

Thermogravimetric Analysis (TGA)

In order to determine the thermal stability of the resulting modified diene-containing (co)polymer, a 5% weight loss temperature was measured by studying the thermal behavior of (co)polymer samples using the simultaneous thermal analysis (STA) method (the combined methods of the differential scanning calorimetry (DSC) and the thermogravimetry (TG)) in accordance with ISO11358 using the apparatus STA 449 Jupiter NETZSCH.

Experimental conditions: the inert atmosphere (argon) in the temperature range from 30° C. to 600° C., a heating rate—10° C./min.

Nuclear Magnetic Resonance (NMR) Method

The microstructure of a polymer chain of modified diene-containing (co)polymer samples was determined by the NMR spectroscopy on $^1$H hydrogen nuclei using the apparatus Bruker Avance III (400 MHz). To prepare the solution for the study, a sample having a weight of 30 mg was dissolved in 0.6 ml of the deuterated chloroform. The number of scans on $^1$H nuclei is 32.

Gel Permeation Chromatography (GPC)

The molecular mass characteristics of samples of the starting diene-containing (co)polymer and the modified diene-containing (co)polymer were determined by the low-temperature GPC method in accordance with ISO 16014-3 on in Agilent 1200 liquid chromatography system with a refractometric detector.

Conditions for the analysis: an eluent is tetrahydrofuran; a temperature of dissolution and measurement is 40° C.; a flow rate of the eluent is 1.0 ml/min; the column PLgel Mixed-C (2-3 pieces). The calculation was carried out according to the relative calibration by polystyrene standards (EasiVial PS-H 4 ml, Agilent Technologies) using Mark-Houwink constants K=0.000374, α=0.699 for a (co) polymer.

Gas Chromatography and Mass Spectrometry (GC-MS)

The identification of components of an impurity that gives color to polystyrene were carried out by the gas chromatography-mass spectrometry (GC-MS) method using the apparatus Agilent 7890/5975 GC-MS:

Conditions of the analysis: capillary column DB-5 (30 m×0.25 mm×0.25 μm);

an evaporator temperature is 290° C.; the initial temperature of the column thermostat is 50° C. (the isotherm 1 minute); a heating rate is 5° C./min; the final temperature of the column thermostat is 310° C. (the isotherm 20 minutes); a carrier gas is helium; a carrier gas flow rate is 1 ml/min; a split ratio is 200:1; an injection volume is 0.2 µl.

Particle-Size Distribution of Polystyrene

Particle-size distribution of polystyrene powder was determined on Test Sieve Shaker HAVER EML digital plus. A set of sieves with a diameter of cells: 2.0; 1.6; 1.0; 0.70; 0.40; 0.20 mm was used for sieving. The sieving time is 15 minutes. The mass of the powder on sieves was determined by the gravimetric method.

Determination of the Yellowness Index of Polystyrene Granules

The determination of the yellowness index of the polystyrene granules containing a flame retardant was carried out by the spectroscopy in the visible spectral region on SP62 X-Rite spectrophotometer in accordance with ASTM D 6290-13 method.

Conditions for conducting researches: A test tube for samples was filled with granules of the samples to the top. The tube filled with granules was placed into the center of the sensor port for the measurement. The sample tube was covered with an opaque, non-light device or a cover. Light source—D65 (daylight), a viewing angle—10°, taking into account the reflected light (spin). To determine the yellowness index, the required readings of the three-color diagram X, Y, Z were obtained. The number of parallel measurements is 3.

The yellowness index value was obtained in accordance with ASTM E 3013-10.

The Compression of Polystyrene Samples

Samples were pressed on a Collin hydraulic press with the power of 300 kN. The sample was previously kept in a drying oven at a temperature of 50° C. The compression of the samples was carried out for 18 minutes, at a gradual heating up to 190° C. for 5 minutes, at a pressure of 50 bar; the sample is maintained under the pressure of 50 bar at 190° C. for 3 minutes. Subsequently, the sample was cooled to 40° C. under the pressure of 50 bar for 10 minutes.

Flame Resistance Test

The determination of the flame resistance of the samples of expandable polystyrene containing a flame retardant was carried out in accordance with TT 2214-019-53505711-2010.

Preparation of a sample: 40 mm was cut from a molded article and this part was discarded. Then, 5 samples were cut with dimensions (190±1)×(90±0.5)×(20.0±0.5) mm so that technological film, cracks, chips and cavities didn't form during the block formation. The bottom edge of the sample should be cut smoothly with sharp edges and form right angles with side edges.

The method is based on determining a height of the flame of the burning sample, for 20 sec after the removal of the flame source.

Preparation for the Test:

The preparation and setup of the device for the operating mode was performed. The ventilation in a chamber was turned off. The air velocity was measured with a thermal anemometer in the exhaust tube of the test chamber. The required value is from 0.5 to 0.8 m/s.

Before testing, the samples were conditioned for at least 14 days at a temperature of (23±5°) C. and the relative air humidity of (50±20)% to a constant mass.

Next, a mark was placed on the sample at a distance of 150 mm from the lower edge on the front side and back side. Then the samples were hung in the burning chamber vertically in a mount with the measuring mark up, and the bottom edge was positioned in the same plane with the mark of the tripod holder. Then the holder with the sample was moved vertically so that the stabilizer nozzle for the flame exposure touched along the lower edge of the sample.

Then the burner was ignited and the flame was adjusted using a template held from the side so that the height of the flame with a yellow glow was (20±1) mm. Before each exposure of the flame to the sample, the height of the flame was checked.

Two layers of a filter paper were placed in a wire box under the sample at the bottom of the test chamber.

Test Performance:

The burning chamber was closed. Sideways to the center of the free end (edge) of the sample, the burner with flame turned at an angle of 45° was placed, after which a stopwatch was started. The sample was exposed to the flame for 15 seconds, after which the burner was removed and the burning of the sample was observed. At the same time, the time from the beginning of the flame exposure to the moment when the top of the flame of the burning sample reached the measured mark of 150 mm was measured, if the flame did not extinguish by itself. The tests were interrupted after 20 seconds (from the beginning of processing the sample by the flame) and the maximum flame height and dripping (falling out of burning fragments) were estimated.

The test is considered to be completed if for each of the 5 tested samples the top of the flame of the burning sample does not go beyond the measuring mark before the 20th second expires, and when burning drops (falling out of burning fragments) fall they burn on the filter paper for no more than 2 seconds, do not result in the burning of the filter paper either.

Example 1. Preparation of a Modified Styrene-Butadiene Copolymer that is Free of Tertiary and Allyl Bromides (According to the Invention)

Into a dark glass flask having a volume of 500 ml, a solution of a starting styrene-butadiene copolymer in dichloromethane (5 g of the copolymer per 50 g of dichloromethane) is added. Next, 15 g of butanol and a solution of tetraethylammonium bromide in dichloromethane (12.96 g of tetraethylammonium bromide per 143 g of dichloromethane) are added to the flask. Then a solution of bromine in dichloromethane (9.56 g of bromine per 9.56 g of dichloromethane) is dosed into the flask and the solution is stirred for 30 minutes at 35° C. Then the reaction mass is washed with three-fold volume excess of distilled water.

After that, the aqueous layer is drained, and an organic layer containing a partially brominated styrene-butadiene copolymer is loaded into the dark glass flask having a volume of 500 ml, equipped with a stirrer, and the stirring is started. Next, a modifying system (0.3 g of bromine and 8.3 g of water) is dosed into the flask and the contents are stirred for 30 minutes at 35° C.

When the reaction is completed, a sodium hydroxide solution is added to the flask and the neutralization is carried out for 60 minutes. Then the reaction mass is washed with a three-fold volume excess of water, followed by the precipitation of the resulting modified styrene-butadiene copolymer with isopropyl alcohol. Next, the resulting modified styrene-butadiene copolymer is dried by distilling off the solvent at a temperature of 30-95° C. and a pressure of 3 kPa, followed by further drying in a vacuum drying oven at 70° C. and under 0.5 kPa.

Characteristics of the modified styrene-butadiene copolymer that is free of tertiary and allyl bromides and obtained according to Example 1 are presented in Table 1.

Figure 2:
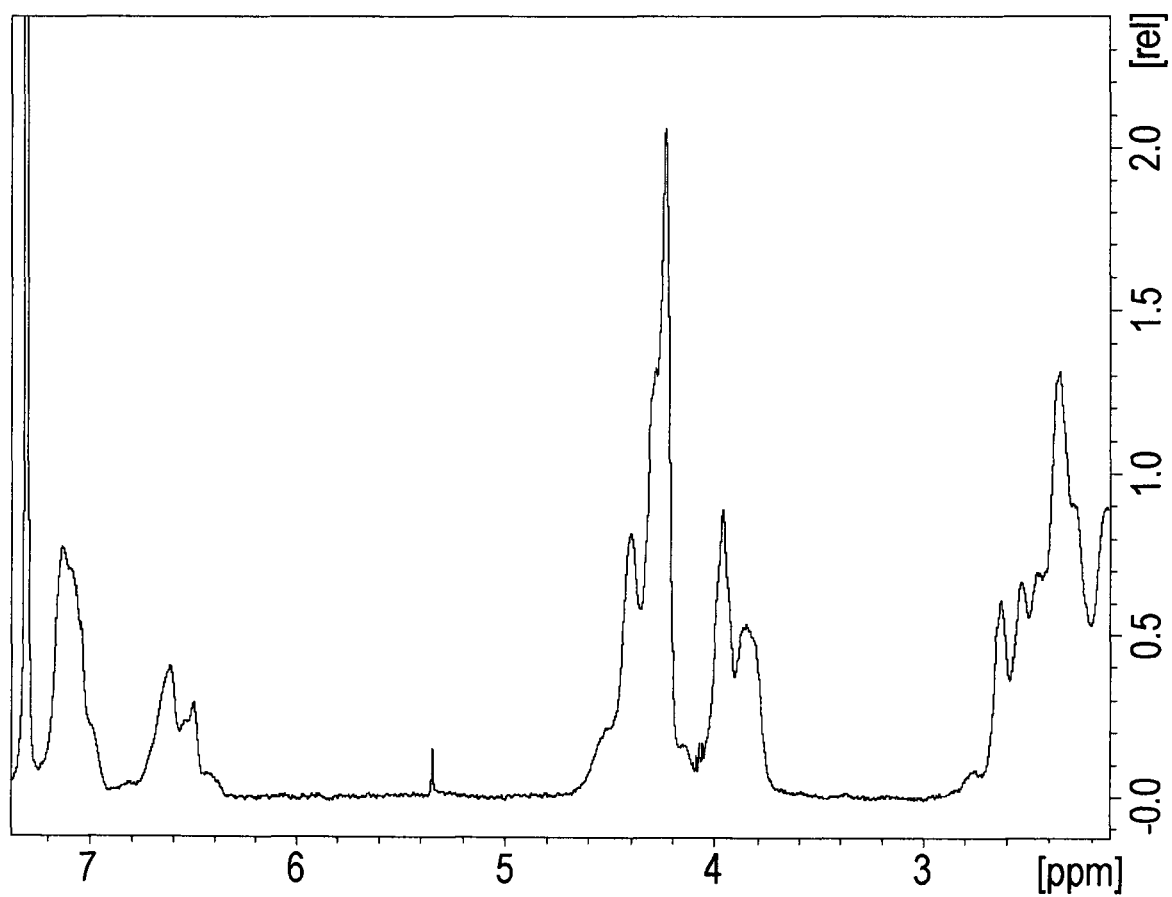

The $^1$H NMR spectrum of the resulting modified styrene-butadiene copolymer is shown in FIG. 2.

The $^1$H NMR spectrum (CDCl$_3$, δ, ppm): 7.2-6.3 (styrene); 4.6-3.7 (brominated butadienes); 3.6 (hydroxyl groups); 3.9-3.7 (hydroxyl groups); 3.0-2.7 (epoxy groups).

Example 2. Preparation of a Modified Styrene-Butadiene Copolymer Containing Allyl Bromides (Comparative)

In the Example the preparation of the modified styrene-butadiene copolymer with the combination of the partial halogenation with the modification step is carried out.

Into a dark glass flask having a volume of 500 ml, a solution of the starting styrene-butadiene copolymer in dichloromethane (5 g of the copolymer per 50 g of dichloromethane) is added. Next, 15 g of butanol, 2.5 g of water, and a solution of tetraethylammonium bromide in dichloromethane (12.96 g of tetraethylammonium bromide per 143 g of dichloromethane) are added to the flask. A solution of bromine in dichloromethane (9.56 g of bromine per 9.56 g of dichloromethane) is dosed into the flask and the solution is stirred for 30 minutes at 35° C. When the reaction is completed, a sodium hydroxide solution is added to the flask and the neutralization is carried out for 60 minutes. Then the reaction mass is washed with a three-fold volume excess of distilled water, followed by the precipitation of the resulting modified styrene-butadiene copolymer, which is free of tertiary bromides and comprises allyl bromides, in isopropyl alcohol, and the solvent is distilled off a temperature of 30-95° C. and a pressure of 3 kPa, followed by further drying in a vacuum drying oven at 70° C. and under 0.5 kPa.

Characteristics of the product obtained according to Example 2 are presented in Table 1.

Figure 3:
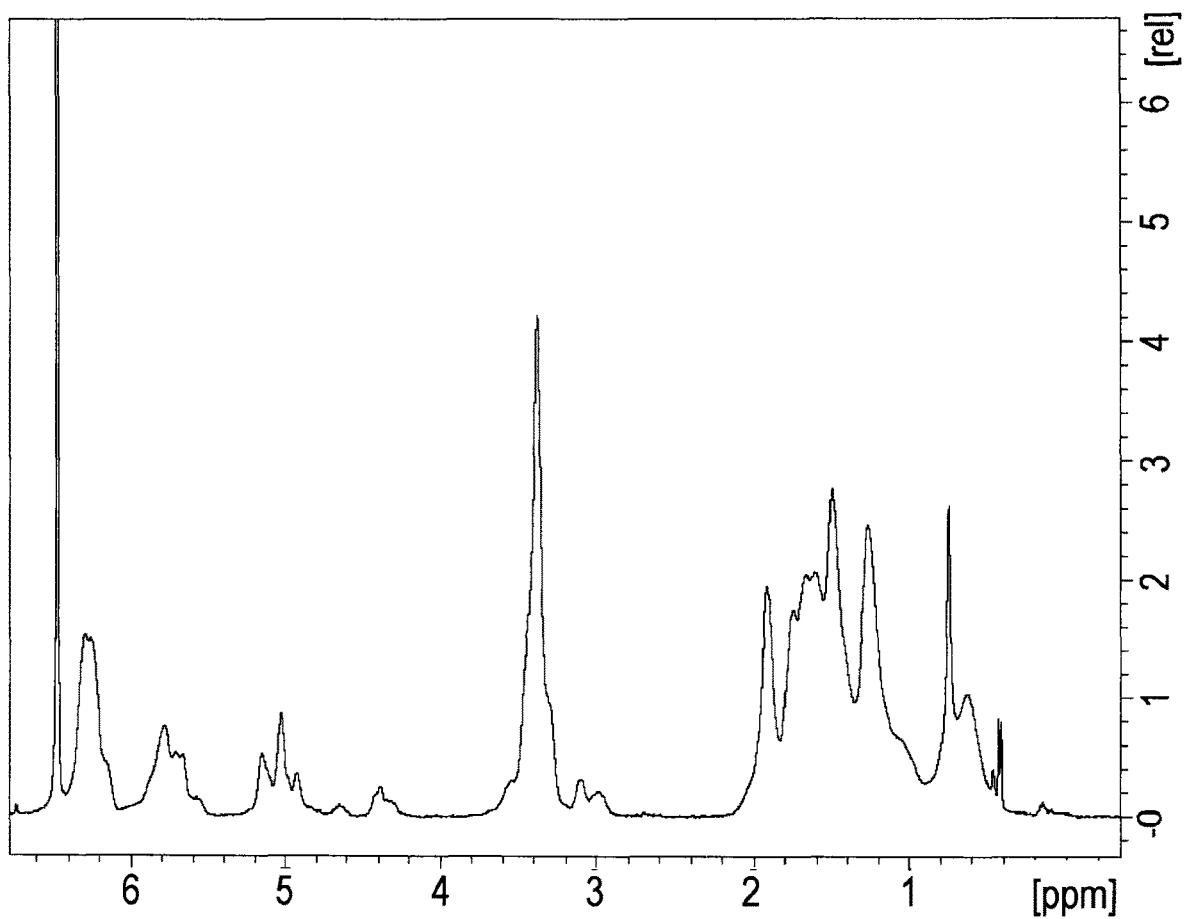

The $^1$H NMR spectrum of the resulting modified styrene-butadiene copolymer is shown in FIG. 3.

Into a dark glass flask having a volume of 250 ml, a solution of the starting styrene-butadiene copolymer in dichloromethane (10 g of the rubber per 150 g of dichloromethane) is added. Next, 30 g of butanol, 7.6 g of water, are added to the flask, after which a solution of 17.74 g bromine in 20 ml dichloromethane is dosed into the flask. The modification reaction is carried out for 30-40 minutes. When the reaction is completed, a sodium hydroxide solution is added to the flask and the neutralization is carried out for 60 minutes. Then the reaction mass containing the modified styrene-butadiene copolymer is washed with a three-fold volume excess of distilled water.

Then the resulting modified styrene-butadiene copolymer is filtered followed by the precipitation thereof with isopropanol, after which it is dried by distilling off the solvent at a temperature of 30-95° C. and a pressure of 3 kPa, followed by the further additional drying in a vacuum drying oven at 70° C. and under 0.5 kPa.

Characteristics of the product obtained according to Example 3 are presented in Table 1.

The $^1$H NMR spectrum of the resulting modified styrene-butadiene copolymer is shown in FIG. 4.

The $^1$H NMR spectrum (CDCl$_3$, δ, ppm): 5.4-6.4 (styrene); 4.6-4.8 (1,4-butadiene); 4.4 (1,2-butadiene); 2.8-3.6 (brominated butadienes); 2.8 (hydroxyl groups); 2.6 (tertiary bromides); 1.9-2.3 (epoxy groups).

Example 4. Preparation of a Modified Styrene-Butadiene Copolymer Containing Allyl Bromides (Comparative)

The preparation of a modified styrene-butadiene copolymer is performed according to the procedure described in Example 1, except for the step c), the step of additional washing and separation, is not performed.

Characteristics of the modified styrene-butadiene (co)polymer comprising allyl bromides and obtained according to Example 4 are presented in Table 1.

TABLE 1

Characteristics of modified styrene-butadiene copolymers

| No. of example | A weight-average molecular weight 10$^3$, g/mol | Decomposition temperature (5% weight loss), ° C. | Unit content, wt. %. | | | | | | | |
|---|---|---|---|---|---|---|---|---|---|---|
| | | | Styrene | 1,2-butadiene | 1,4-butadiene | Bromo-butadiene | Hydroxy-butadiene | Epoxy-butadiene | Tertiary bromide | Allyl bromide |
| Example 1 | 100 | 241 | 20.20 | 2.19 | — | 76.92 | 0.13 | 0.05 | — | — |
| Example 2 | 80 | 230 | 27.02 | 6.05 | 0.30 | 56.76 | 0.06 | 0.03 | — | 9.78 |
| Example 3 | 120 | 220 | 20.85 | — | — | 76.32 | 0.53 | 0.78 | 1.52 | — |
| Example 4 | 100 | 231 | 24.88 | 6.53 | — | 61.42 | 0.11 | 0.04 | — | 7.51 |

The $^1$H NMR spectrum (CDCl$_3$, δ, ppm): 5.5-6.4 (styrene); 5.2-4.8 (allyl bromide); 4.6 (1,4-butadiene); 4.4 (1,2-butadiene); 3.6-2.8 (brominated butadienes); 2.8-3.0 (hydroxyl groups); 2.4-2.1 (epoxy groups).

Example 3. Preparation of a Modified Styrene-Butadiene Copolymer Containing Tertiary Bromides (Comparative)

In the Example the modified styrene-butadiene copolymer is obtained without the conduction of the preliminary partial halogenation.

Example 5. Preparation of Expandable Polystyrene parts of water, 0.43 parts of a polymerization stabilizer (a mixture of sodium pyrophosphate and magnesium sulfate) are mixed in a flask at a temperature of 25° C. A mixture of 100 parts of styrene, 0.46 parts of a mixture of polymerization initiators (benzoyl peroxide and tert-butylperbenzoate), 0.62 parts of a flame retardant, prepared in accordance with examples 1 and 3, and 0.21 parts of a synergist of the flame retardant, namely dicumyl peroxide, are added to this mixture upon stirring. The mixture is stirred for 2 hours at a temperature of up to 85° C., then it is heated to 115° C. for 4.5 hours. 70 minutes after the temperature in the flask reaches 80° C., a 10% aqueous solution of polyvinylpyrrolidone is added to the reaction mixture. After other 100-120 minutes, a solution of 0.10 parts of a chain transfer agent in 4.7 parts of an expanding agent, namely n-heptane, is added to the reaction mass to expand polystyrene. After reaching 115° C., the flask is maintained at the constant temperature for 3 hours, after which the mixture is cooled to a temperature of 25° C. for 3 hours.

Granules of the expanded polystyrene containing the flame retardant according to Example 3 have a yellowish tint (Table 2). The authors of the present invention presumably associate this with the fact that during the conduction of the step of expanding polystyrene at the high temperature of 115° C. bromine radicals start to be released from the unstable positions of the flame retardant molecule, in particular, from the allyl and/or tertiary positions. At the same time, presumably, the bromine radicals catalyze chain radical processes of the oxidation of aromatic nuclei in the system in the presence of peroxides, which results in the formation of small amounts of para-benzoquinone (approximately 0.89 wt. %), the formation of which is recorded by the gas chromatography-mass spectrometry (GC-MS) method. At the same time, the starting styrene did not contain hydroquinone (a tert-butylpyrocatechin stabilizer). Para-benzoquinone is colored into the bright-yellow, so in a small concentration it imparts the yellowish color to the final product.

Table 2 presents the results of the comparison of the yellowness index (an average yellowness index) for the expanded polystyrene granules, containing flame retardants in accordance with the Examples 1 and 3, and HBCD.

TABLE 2

The comparison of the yellowness index of the
expanded polystyrene granules comprising flame retardants

| Flame retardant | The average yellowness index |
|---|---|
| HBCD | 1.42-2.1 |
| Example 1 | 3 |
| Example 3 | 7.36 |

The determination of the particle-size distribution of polystyrene obtained before the expanding step was also performed. Results of the determination of the particle-size distribution are presented in Table 3.

TABLE 3

The particle-size distribution of the polystyrene containing a flame retardant

| | Example 5 Flame retardant (according to the example) | | | |
|---|---|---|---|---|
| No. of Sieve | Example 1 | Example 2 | Example 3 | Example 4 |
| 2.00 | 2.48 | 11.22 | 0.08 | 9.81 |
| 1.60 | 25.22 | 22.16 | 1.85 | 20.13 |
| 1.00 | 65.59 | 41.58 | 62.27 | 44.51 |
| 0.70 | 5.31 | 17.15 | 25.59 | 17.43 |
| 0.40 | 1.21 | 7.27 | 8.51 | 5.35 |
| The bottom | 0.19 | 0.62 | 2.70 | 2.77 |
| The sum of target fractions (1.60 + 1.00 + 0.70) | 96.12 | 80.89 | 89.71 | 82.07 |

It is obvious to a person skilled in the art from the data presented in Table 1 that the hydroxy-epoxy-brominated styrene-butadiene copolymer obtained in Example 1, which is free of tertiary and allyl bromides, has the better thermostability than hydroxy-epoxy-brominated styrene-butadiene copolymers, which comprise in the structure thereof tertiary or allyl bromides (Examples 2-4). Wishing not to be bound by any theory, the authors of the present invention believe that the presence of a significant amount of water in the reaction system at the halogenation step results in the formation of allyl halogenides, which, in turn, results in the decrease in the thermostability of the resulting modified (co)polymer. The presence of two types of functional groups, in addition to halogen atoms, in the modified diene-containing (co)polymer allows to solve several problems, namely, epoxy groups function as absorbers of the HBr that, as mentioned above, can be released during the processing of polymers and polymer compositions comprising a flame retardant, at high temperatures. In turn, the hydroxyl groups impart a polar and hydrophilic character to the (co)polymer.

As the result, upon the introduction of a flame retardant into the process of the suspension polymerization of styrene, the stable suspension is formed, the process of styrene polymerization proceeds without deviation due to the complex influence of three types of functional groups, namely, epoxy group, hydroxyl group and halogen atoms simultaneously present in the modified diene-containing (co)polymer. This results in the better distribution of the flame retardant in the suspension during the suspension polymerization of styrene, which allows to obtain the particle-size distribution of polystyrene that meets the requirements of consumers.

Furthermore, the flame retardant obtained in accordance with the present invention is characterized by the preferable absence of tertiary and/or allyl halogenides in the structure thereof, which also results in the increase in the thermostability of the resulting flame retardant. This, in turn, is characterized by the absence of halogen radicals, which at high temperatures, including in the process of expanding polystyrene, can be released from all unstable positions, in particular, tertiary and/or allyl, and enter into radical reactions, which can result in the appearance of the chromaticity of the expanded polystyrene compared with the expanded polystyrene containing HBCD. This is confirmed by the comparison of the chromaticity of granules of polystyrene containing HBCD and the granules of polystyrene containing the flame retardant according to the present invention.

It follows from data presented in Table 2 that the introduction of the hydroxy-epoxy-brominated styrene-butadiene copolymer obtained in Example 1, which is free of tertiary and allyl bromides, has the significantly less effect on the chromaticity of the resulting polystyrene granules.

Hydroxy-epoxy-brominated styrene-butadiene copolymers obtained according to Examples 1-4, being incorporated into polystyrene, do not affect the particle-size distribution, the stable suspension is formed, and granules of the required size, which fully satisfy TT 2214-019-53505711-2010, are obtained (Table 3).

The invention claimed is:
1. A modified diene-containing (co)polymer having the general formula (1):

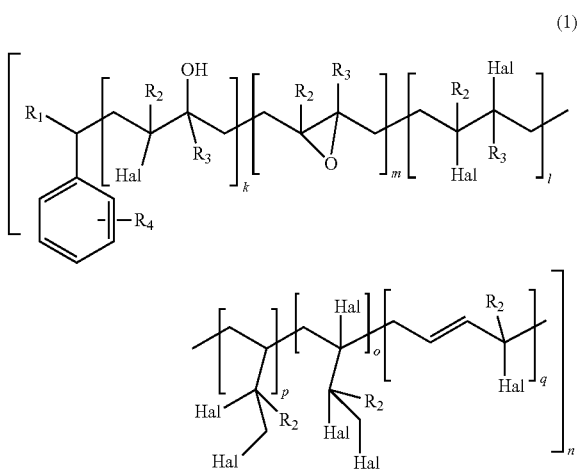

(1)

wherein $R_1$-$R_4$ are the same or different and represent hydrogen or a hydrocarbon group having from 1 to 6 carbon atoms or alkyl group; Hal is halogen; n—a quantity of polymer chain units that is $1<n<400$, k, m, l, p, o, q may be the same or different and constitute $1<k<37$, $0<m<19$, $2<(l+p)<3660$, $0<o<8$, $0<q<8$, wherein a 5% weight loss temperature is at least 180° C., having a weight average molecular weight of at least 1500 g/mol and a halogen content of at least 35 wt. % in the polybutadiene part of the (co)polymer, wherein it comprises in its structure in addition to halogen atoms at least one epoxy group, at least one hydroxyl group, and from 0 to less than 1.5 wt. % of tertiary and/or allyl halogenides in the polybutadiene part of the (co)polymer.

2. The modified diene-containing (co)polymer according to claim 1, wherein the indicated (co)polymer has a 5% weight loss temperature of at least 220° C.

3. The modified diene-containing (co)polymer according to claim 1, wherein the (co)polymer has a weight-average molecular weight from 2000 to 280000 g/mol.

4. The modified diene-containing (co)polymer according to claim 1, wherein the content of halogen atoms is at least 60 wt. %.

5. The modified diene-containing (co)polymer according to claim 1, wherein the content of epoxy groups is from 0.01 to 5 wt. %.

6. The modified diene-containing (co)polymer according to claim 1, wherein the content of hydroxyl groups is from 0.05 to 5 wt. %.

7. The modified diene-containing (co)polymer according to claim 1, wherein the content of tertiary and/or allyl halogenides is from 0 to less than 1 wt. %.

8. The modified diene-containing (co)polymer according to claim 1, wherein it is a modified butadiene polymer, a modified styrene-butadiene copolymer or a modified styrene-butadiene-isoprene copolymer.

9. The modified diene-containing (co)polymer according to claim 1, wherein halogen in the structure of the modified diene-containing (co)polymer is chlorine, bromine or iodine.

10. A method for producing a modified diene-containing (co)polymer according to claim 1 that comprises the following steps:

a) dissolution step, comprising dissolution of a starting diene-containing (co)polymer in an organic solvent;
b) partial halogenation step, which comprises using a halogenating agent and optionally an aliphatic alcohol to partially halogenate the diene-containing (co)polymer to a halogenation degree of at least 60%;
c) washing and separation step, comprising adding water to a reaction mass obtained in step b) followed by separating an aqueous layer and an organic layer;
d) modification step, comprising adding components of a modifying system and optionally an aliphatic alcohol to the organic layer obtained in step c) comprising a partially halogenated diene-containing (co)polymer;
e) neutralization and separation step, comprising adding an aqueous solution of a neutralizing agent to the reaction mass obtained in step d) followed by separating an aqueous layer and an organic layer;
f) isolation step, comprising precipitating or degassing a modified diene-containing (co)polymer;
g) filtration and subsequent drying step, comprising filtration and drying the isolated modified diene-containing (co)polymer, wherein in the partial halogenation step b) the admissible water content in the system is from 0 to less than 0.5 wt. %, and in the modification step d) as the modifying system a mixture of halogen and water is used in a halogen:water ratio from 1:0.01 to 1:1, per the total amount of double bonds in the starting diene-containing (co)polymer.

11. The method according to claim 10, wherein in the of partial halogenation step b) the admissible water content in the system is from 0 to less than 0.3 wt. %.

12. The method according to claim 10, wherein a starting diene-containing (co)polymer is polymers and copolymers of a conjugated diene.

13. The method according to claim 12, wherein the conjugated diene is the conjugated diene selected from the group consisting of 1,3-butadiene, 2-methyl-1,3-butadiene (isoprene), 2-ethyl-1,3-butadiene, 2,3-di(C1-C5 alkyl)-1,3-butadienes, such as 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, 2-methyl-pentadiene, 4-methyl-pentadiene, or mixtures thereof.

14. The method according to claim 12, wherein vinylaromatic compounds selected from the group consisting of styrene, α-methylstyrene, ortho-, meta- and para-methyl styrene, 3-vinyltoluene, ethylvinyl benzene, 4-cyclohexyl-styrene, para-tert-butyl styrene, methoxystyrenes, vinyl mesitylene, divinylbenzene, 1-vinylnaphthalene, 2,4,6-trimethylstyrene, or a mixture thereof are used as a comonomer in the starting diene-containing (co)polymer.

15. The method according to claim 10, wherein the starting diene-containing (co)polymer is butadiene polymer, styrene-butadiene copolymer or styrene-butadiene-isoprene copolymer.

16. The method according to claim 10, wherein the starting diene-containing (co)polymer has a weight-average molecular weight of at least 700.

17. The method according to claim 10, wherein the starting diene-containing (co)polymer has a polydispersity index from 0.8 to 3.

18. The method according to claim 10, wherein the content of 1,2-units in the starting diene-containing (co)polymer is from at least 10 to 100 wt. % per a polybutadiene part of the (co)polymer.

19. The method according to claim 10, wherein organic solvents representing ethers, halogenated saturated aliphatic hydrocarbons, cycloaliphatic hydrocarbons, aromatic hydrocarbons, halogenated aromatic hydrocarbons are used as a solvent in the dissolution step a).

20. The method according to claim 19, wherein tetrahydrofuran, chloroform, dichloromethane, dichloroethane, cyclohexane, toluene, are used as a solvent in the dissolution step a).

21. The method according to claim 10, wherein a weight ratio of an organic solvent to a starting diene-containing (co)polymer in the dissolution step a) is from 5:1 to 30:1.

22. The method according to claim 10, wherein a halogenation degree in the partial halogenation step b) is at least 90%.

23. The method according to claim 10, wherein in the partial halogenation step b) chlorine, bromine or iodine is used as halogen in a halogenating agent.

24. The method according to claim 10, wherein a halogenating agent is bromine alone, a solution comprising not more than 70 wt. % bromine, quaternary ammonium bromides, quaternary phosphonium bromides, or mixtures thereof.

25. The method according to claim 24, wherein elemental bromine and quaternary ammonium bromides are selected from the group consisting of phenyltriethylammonium bromide, benzyltrimethylammonium bromide, tetramethylammonium bromide, tetraethylammonium bromide, tetrapropylammonium bromide, tetra-n-butylammonium bromide, or mixtures thereof are used as a quaternary ammonium bromide or quaternary phosphonium bromides comprising tetramethylphosphonium bromide, tetraethylphosphonium bromide, tetrapropylphosphonium bromide, tetra-n-butylphosphonium bromide, or mixtures thereof are used as a quaternary phosphonium bromide.

26. The method according to claim 10, wherein a molar ratio of a starting diene-containing (co)polymer:halogenating agent:aliphatic alcohol is from 1:1.5:3 to 1:5:3.

27. The method according to claim 10, wherein a molar ratio of elemental bromine:bromine atoms in the quaternary ammonium bromide or quaternary phosphonium bromide is from 1:1 to 1:4.

28. The method according to claim 10, wherein methanol, ethanol, propanol, iso-propanol, butanol, iso-butanol, pentanol, hexanol are used as an aliphatic alcohol in the step b) of partial halogenating.

29. The method according to claim 10, wherein the partial halogenation step b) is performed at a temperature from 0 to 50° C.

30. The method according to claim 10, wherein in the partial halogenation step b) a stirring rate of the reaction mass after the addition of the halogenating agent is from 50 to 600 rpm.

31. The method according to claim 10, wherein the time of the conduction of the partial halogenation step b) is at least 15 minutes.

32. The method according to claim 10, wherein in washing and separation step c) the admissible residual content of the halogenating agent in the organic layer after washing with water is from 0 to 0.5 wt. %.

33. The method according to claim 10, wherein a halogen: water ratio in a modifying system in step d) is from 1:0.5 to 1:0.7.

34. The method according to claim 10, wherein chorine, bromine or iodine is used as a halogen in the modifying system in step d).

35. The method according to claim 10, wherein bromine in the modifying system in step d) is used in the form of bromine as such, or in the form of a solution comprising not more than 70 wt. % bromine.

36. The method according to claim 10, wherein water in the modifying system in step d) is distilled, deionized, demineralized, osmotic, or double-distilled water.

37. The method according to claim 10, wherein methanol, ethanol, propanol, iso-propanol, butanol, iso-butanol, pentanol, or hexanol, is used as an aliphatic alcohol in the modification step d).

38. The method according to claim 10, wherein in the modification step d) a starting diene-containing (co)polymer:modifyingsystem:aliphatic alcohol ratio is from 1:1.5:3 to 1:5:3.

39. The method according to claim 10, wherein the modification in step d) is performed at a temperature from 0 to 50° C.

40. The method according to claim 10, wherein the time of the conduction of the modification step d) is at least 15 minutes.

41. The method according to claim 10, wherein aqueous solutions of sodium hydroxide, sodium thiosulfate, sodium bisulfite, or sodium carbonate is used as a neutralizing agent in the neutralization step e).

42. The method according to claim 10, wherein a molar ratio of an amount of the neutralizing agent to an amount of halogen added in the modification step d) is from 1:1 to 3:1.

43. The method according to claim 10, wherein the neutralization process in step e) is performed at a temperature from 15 to 50° C.

44. The method according to claim 10, wherein upon the precipitation in the isolation step f) methanol, ethanol, propanol, iso-propanol, butanol, iso-butanol are used as an alcohol-precipitant.

45. The method according to claim 10, wherein a weight ratio of alcohol-precipitant:modified diene-containing (co)polymer is from 15:1 to 1:1.

46. The method according to claim 10, wherein upon degassing in the isolation step f) water is distilled, deionized, demineralized, osmotic, or bidistilled water.

47. The method according to claim 46, wherein a temperature of water while it is added to the system is not more than 30° C.

48. The method according to claim 10, wherein upon degassing in the isolation step f) a volume ratio of the added water:organic layer is from 5:1 to 0.1:1.

49. The method according to claim 10, wherein the degassing in the isolation step f) is performed at a temperature from 20 to 150° C.

50. The method according to claim 10, wherein the degassing in the isolation step f) is performed under pressure of less than 800 mbar.

51. The method according to claim 10, wherein the time of the conduction of degassing in the isolation step f) is at least 30 minute.

52. The method according to claim 10, wherein the filtration of the modified diene-containing (co)polymer in step g) is performed in filters supplied with porous filtering partitions, nutsch-filters.

53. The method according to claim 10, wherein the filtration of the modified diene-containing (co)polymer in step g) is performed at a temperature from 20 to 40° C.

54. The method according to claim 10, wherein the drying of the modified diene-containing (co)polymer in step g) is performed at a temperature from 50 to 105° C.

55. The method according to claim 10, wherein the drying of the modified diene-containing (co)polymer in step g) is performed under pressure from 1 to 20 kPa.

56. The method according to claim 10, wherein the starting diene-containing (co)polymer is pre-ground.

57. A flame retardant comprising a modified diene-containing (co)polymer according to claim 1.

58. The flame retardant according to claim 57, wherein the modified diene-containing (co)polymer is used as the flame retardant in an expandable polystyrene.

59. An expandable polystyrene comprising a modified diene-containing (co)polymer according to claim 1 as a flame retardant.

60. The expandable polystyrene according to claim 59, wherein the content of the modified diene-containing (co)polymer is not less than 0.5 weight parts.

61. A polymer composition based on an expandable polystyrene, comprising a modified diene-containing (co)polymer according to claim 1 as a flame retardant and additives.

62. The polymer composition according to claim 61, wherein antistatics, stabilizers, dyes, lubricants, fillers, adhesion reducing agents are used as additives.

* * * * *